Jan. 24, 1967  E. H. BATUR  3,300,769

OIL DEFICIENCY INDICATOR

Filed Nov. 3, 1964  2 Sheets-Sheet 1

INVENTOR
EUGENE H. BATUR

BY Allen, Hammans Cantor

ATTORNEYS

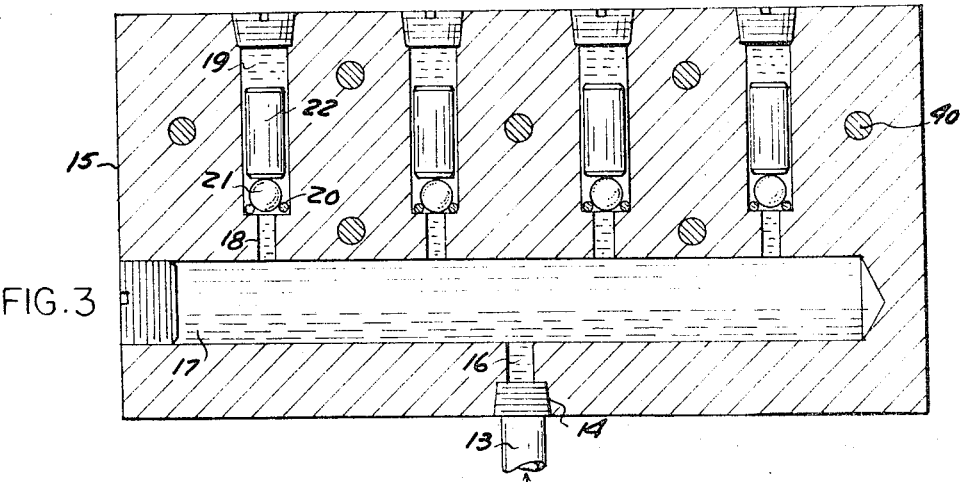
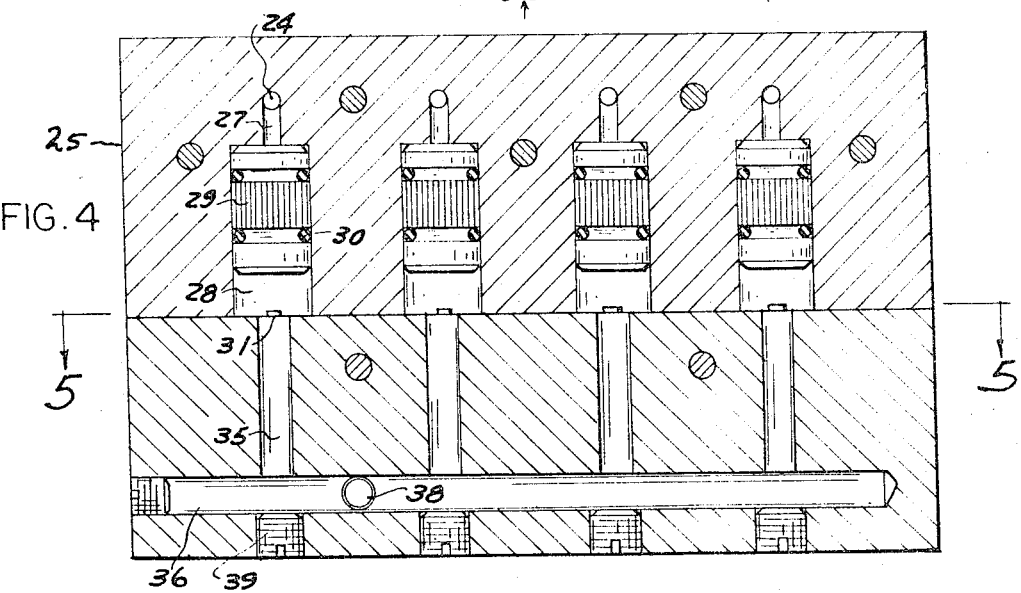
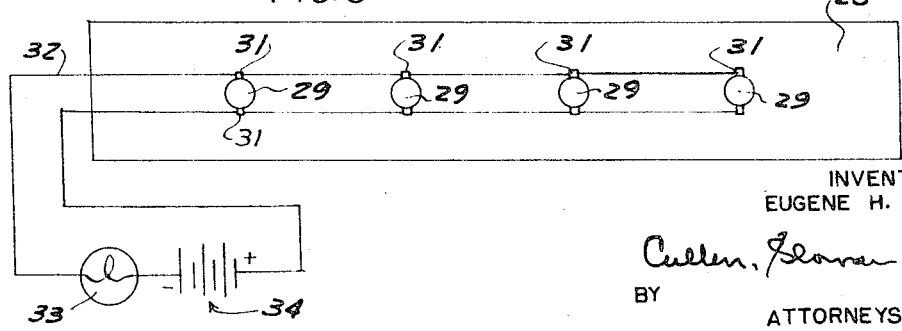

3,300,769
OIL DEFICIENCY INDICATOR
Eugene H. Batur, Birmingham, Mich., assignor to Future Products Tool Corporation, Clawson, Mich., a corporation of Michigan
Filed Nov. 3, 1964, Ser. No. 408,627
4 Claims. (Cl. 340—270)

The present invention relates to an oil deficiency indicator for a machine tool and particularly for tools having a series of bearing points requiring constant and continued lubrication, such as stamping presses and machines.

The invention is directed to a safety oil deficiency indicator wherein should there be a breakdown in any of the individual flexible conduits leading from the lubricating device to an individual bearing or other part requiring lubrication, there will be an audible or visual signal given.

The invention is distinguished from signaling devices for indicating a major breakdown in the source of lubrication. The present invention is not directed to a breakdown in the lubrication source. Very often in machine tools or the like the main source of lubrication may be constant to a central delivery area, however, there may be a breakdown in any one of the individual and plural conduits from the supply of lubrication to an individual point on the machine.

Therefore, the primary object of the present invention is to detect, not a breakdown in the main source of supply but a breakdown in any one of the individual flexible conduit lines from an established source to a point on a machine requiring lubrication.

It is another object to provide a safety lubricator which maintains a reservoir which is normally full of lubricating oil and which is connected to an intermittently operable oil pumping source and wherein the lubricator has a plurality of delivery chambers and associated control chambers and wherein a breakdown in any individual supply line to a machine tool part will cause a responsive action in a corresponding control chamber for activating an electrical signal which may be audible or visual.

These and other objects will be seen from the following specification and claims in conjunction with the appended drawings in which:

FIG. 3 is a section taken in the direction of arrows 3—3 of FIG. 2.

FIG. 4 is a section taken in the direction of arrows 4—4 of FIG. 2.

FIG. 5 is a wiring diagram, being a section taken in the direction of arrows 5—5 of FIG. 4.

It will be understood that the above drawings illustrate merely a preferred embodiment of the invention, and that other embodiments are contemplated within the scope of the claims hereafter set forth.

Figure 1:
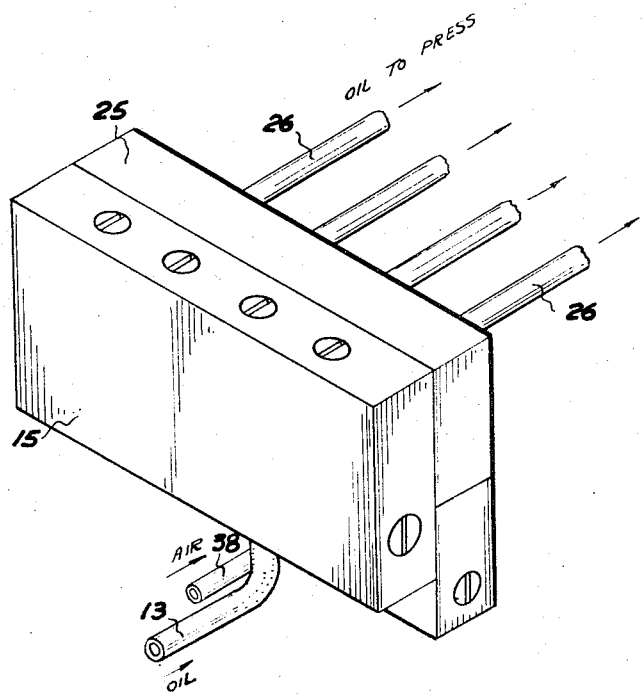
FIG. 1 is a front perspective view of the present oil deficiency indicator.
Figure 2:
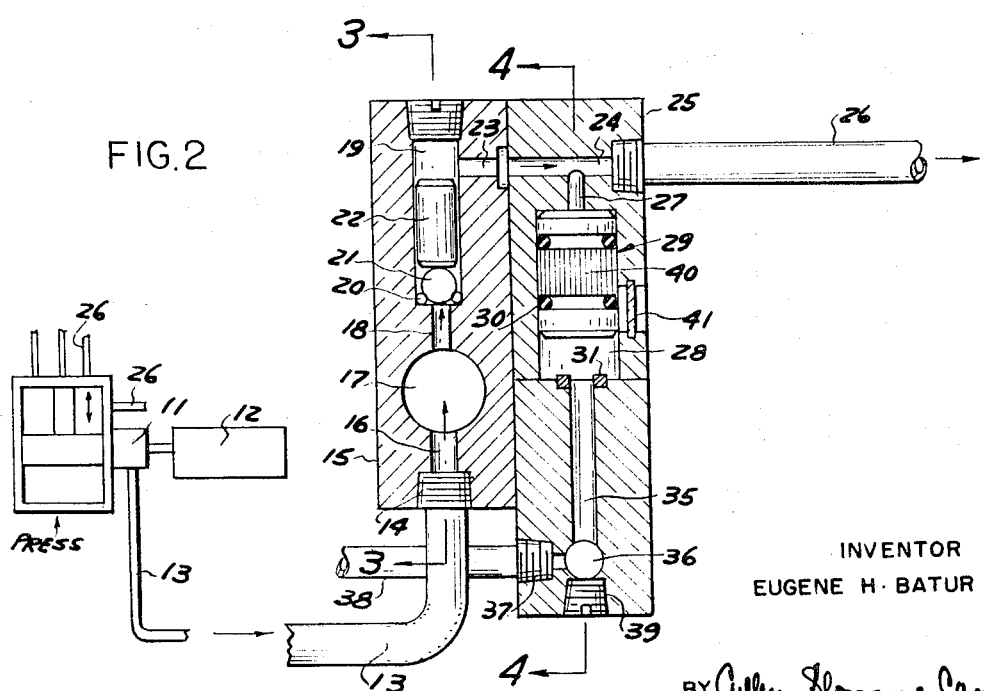
FIG. 2 is a transverse section thereof with the machine tool schematically shown on reduced scale and connected therewith.

Referring to the drawings, particularly FIGS. 1 and 2, a stamping press is shown designated by the words "press" which may be any form of machine tool having a plurality of points requiring continued lubrication. Connected with the press or other machine tool, there is provided a conventional intermittently operable oil source. This includes pump 11, oil or other lubricant supply reservoir 12 and conduit 13 from the pump directed to fitting 14 of body 15.

Passage 16, FIG. 2, delivers lubricating oil or the like to the elongated reservoir 17 within said body. Said reservoir is connected with a series of inlet passages 18, FIG. 3, which respectively connect a series of upright delivery chambers 19. Each delivery chamber has a seal or seat 20 with which the ball check valve 21 registers with some means provided for biasing the ball to the seated position shown.

In the event the delivery chambers 19 are upright, cylindrical weights 22 are employed loosely positioned within chamber 19 to normally bias ball valve 21 to the seated position shown. The weight 22 could be replaced by any other form of bias, such as a coiled spring. Connected to each delivery chamber is an outlet 23 which connects passage 24 in the connected sub-housing 25 terminating in a suitable fitting connecting flexible conduit 26.

For each delivery chamber 19, there is a separate outlet 23 and connected passage 24 for delivery of lubricating oil or other lubricant to a separate and independent flexible conduit 26. These conduits are connected to the press, FIG. 2, being broken off and shown diagrammatically.

Within housing 25 attached by fasteners 40 to body 15, there are provided a series of upright electrically insulated control chambers 28. These at their one ends are respectively connected to delivery passage 24 by passage 27. Chambers 28 are electrically insulated. This can be accomplished by forming sub-housing 25 of a dielectric material such as a plastic substance or other non-electrically conductive material.

Movably sealed within each of the chambers 28 is an electrically conductive piston 29 which mounts the "O" ring seals 30 and is normally maintained as by friction, for example, or other means, in spaced relation with respect to a pair of spaced insulated electrical contacts 31 at the bottom of each chamber 28. Each of the respective pairs of spaced contacts 31 are arranged in a parallel circuit 32, FIG. 5, within housing 25. Said circuit includes signal device 33 which may be an electric light or could be a buzzer or a bell, and also includes a source of electrical power 34.

If any piston 29 moves downwardly to contact and close the gap between a pair of contacts 31, the electrical circuit to that extent will be closed for activating signal 33 to indicate a breakdown in one of the delivery conduits 26, such as a stop up, crimping or fouling thereof.

OPERATION

Piston 29 may be frictionally positioned movably within control chamber 28, FIG. 2, out of connection with contacts 31 at the bottom of said chamber.

In the event that an individual conduit 26 becomes crimped, bent or otherwise stopped-up, cutting off or reducing the required flow of lubricant to a particular part of the machine tool or press, FIG. 2, there will be a very small build up of pressure and a flow of lubricant through passage 27 into the upper end of the corresponding chamber 28. As this flow continues through passage 27, since the fluid cannot flow through conduit 26 or is reduced in proportion to the amount that is being intermittently delivered on an automatic basis by pump 11, then within a short period piston 29 will be moved downwardly to bridge contacts 31 energizing signal 33, FIG. 5.

Extending axially from control chambers 28 are a series of spaced passages 35, FIG. 4, which terminate in transverse elongated chamber 36. Threaded removable plugs 39 project into housing 25 in axial registry with passages 35. By removing a plug 39, a suitable tool may be inserted into passage 35, for returning piston 29 to inoperative position, FIGS. 2 and 4.

ALTERNATE OPERATION AND CONSTRUCTION

The passages 35 may be regarded as air passages which communicate with chamber 36. Through fitting 37 a constant source of air pressure may be connected as by conduit 38 for maintaining sufficient air under pressure within passages 35 to normally but yieldably support the sealed pistons 29 in the inoperative position shown. Should any of the flexible conduits 26 be blocked or be prevented from fully delivering lubrication, the individual piston 29 would be moved downwardly by lubricant pressure acting against the air pressure supplied to passage 35. As soon as the condition was corrected, the constant source of air pressure through passage 35 would return the piston 29 to inoperative elevated position, FIG. 2.

OPERATION

Upon each actuation of the automatic intermittently operated pump 11 on the press, FIG. 2, a limited quantity of oil is delivered to the filled reservoir 17 and to passages 18 pushing the respective balls 21 and weights 22 upwardly. A limited and measured quantity of lubricant flows past each ball and weight into each delivery chamber 19 including passages 23 and 24 and connected conduit 26. The conduit passages are maintained full of lubricant at all times and a substantially static condition exists with a very minimum pressure or none at all since the ball 21 drops down over seal 20.

Thus, intermittently upon repeated operations of the intermittently operable pump 11, oil will flow through the oil lines 26 to various portions of the machine tool requiring lubrication. If any particular line becomes kinked or blocked oil will flow down instead through the corresponding passage 27 pushing piston 29 downwardly until it bridges contact 31 for activating the circuit to alarm 33, FIG. 5.

Oil pressure from the intermittently operable lubricator 11 is not necessarily transmitted above ball check valve 21 since a static condition exists and only sufficient oil is delivered into chamber 19 and passages 23, 24 and conduit 26 to replace the oil which is gradually withdrawn at the bearing point on the machine or other point requiring lubrication. The oil is delivered from pump 11 through conduit 13 to reservoir 17 at a pressure of approximately 1 to 4 pounds per square inch. This lubricant may be grease or oil, or any other lubricant.

In tools of this type, pump 11 is intermittently operated under the control of the press normally after each 30 strokes, for illustration, but this can be regulated. There is a suitable linkage employed so that after each 30 strokes the pump receives its single actuation. Each actuation of the pump may deliver, for example, one cubic centimeter of lubricant.

In the prior art there are no doubt signal devices which would indicate a breakdown of the main source of lubrication to a machine tool or other device. However, assuming that the main source of oil pressure is constant, the present indicator gives a safety signal which otherwise would not be present if any one of the individual lubricant delivery lines 26 became partly or fully stopped-up and ineffective for delivering the required quantity of lubrication. This would occur even though the main source of oil pressure was maintained constant and without the present safety signal device there would be no way of knowing that an individual part of the machine tool failed to receive proper lubrication. This could result in a breakdown and severe machine damage requiring expensive shut-downs; all of which can be avoided by incorporating the present lubrication deficiency indicator into the supply of lubrication to the machine tool parts.

Piston 29 is colored red, for illustration, at its central portion 40. When piston 29 engages contacts 31, its colored portion will be visible through window 41 in housing 25. Thus, the particular clogged line 26 will be visibly indicated.

Having described my invention, reference should now be had to the following claims.

I claim:
1. In an oil deficiency indicator for a machine tool, a body having an oil reservoir, an intermittently operable oil source including a pump connected to said reservoir;
a delivery chamber in said body having an inlet communicating with said reservoir and an outlet;
a conduit between said outlet and a part of said machine tool requiring lubrication;
an electrically insulated control chamber in said body;
a pair of spaced insulated electrical contacts at one end of said control chamber and forming a part of a normally open electrical circuit, including a signal device;
an electrically conductive piston movably positioned and sealed within said control chamber and spaced from said contacts;
a first passage communicating between said outlet and the side of said control chamber on the opposite side of said piston from said contacts;
an air passage in said body communicating with said control chamber on the same side of said piston as said contacts;
and a source of constant air pressure connected to said air passage yieldably maintaining said piston spaced from said contacts;
any blocking of said conduit to said tool cutting off or reducing flow of lubricant thereto and providing a flow of oil through said first passage to said control chamber with sufficient pressure built up for moving said piston against the bias produced by said source of constant air pressure, thereby causing said piston to bridge said contacts and close said circuit.

2. In the oil deficiency indicator of claim 1, a ball check valve in said delivery chamber normally biased into a seated position closing said chamber inlet.

3. In the oil deficiency indicator of claim 1, there being a plurality of spaced delivery chambers in the body communicating with said reservoir, each having an outlet;
additional conduits between said outlets and parts of said tool respectively requiring lubrication;
additional electrically insulated control chambers with movable pistons therein, within said body;
a pair of spaced insulated electrical contacts at one end of each of said additional control chambers, each pair of said contacts forming a part of a normally open electrical circuit including a signal device;
said pairs of contacts being arranged in a parallel circuit whereby the closing of any pair of said contacts will energize said signal device;
there being separate passages between the outlets of each additional delivery chamber and said additional control chambers respectively, whereby the blocking of any conduit to any portion of the machine tool will within a very short period provide a signal indicating such breakdown in lubrication.

4. In the oil deficiency indicator of claim 3, a portion of each piston having a colored surface;
said body having transparent portions corresponding to each conduit for respective visual registry with any piston engaging said contacts to indicate which conduit is clogged.

References Cited by the Examiner

UNITED STATES PATENTS

| | | | |
|---|---|---|---|
| 949,339 | 2/1910 | Weihman. | |
| 1,090,669 | 3/1914 | Woodington. | |
| 1,289,903 | 12/1918 | Pogue | 340—270 |
| 2,826,754 | 3/1958 | Carignan | 340—270 |
| 2,829,597 | 4/1958 | Patterson | 200—81.9 |
| 3,057,977 | 10/1962 | Caswell | 200—81.9 |

FOREIGN PATENTS

| | | |
|---|---|---|
| 581,478 | 11/1924 | France. |
| 769,672 | 8/1934 | France. |
| 1,071,902 | 9/1954 | France. |

NEIL C. READ, *Primary Examiner.*

R. M. GOLDMAN, D. L. TRAFTON,
*Assistant Examiners.*